Jan. 9, 1934.  O. WITTEL  1,942,890
MOTION PICTURE FILM MAGAZINE
Filed Aug. 10, 1931  2 Sheets-Sheet 2
*Fig.9.*  *Fig.10.*
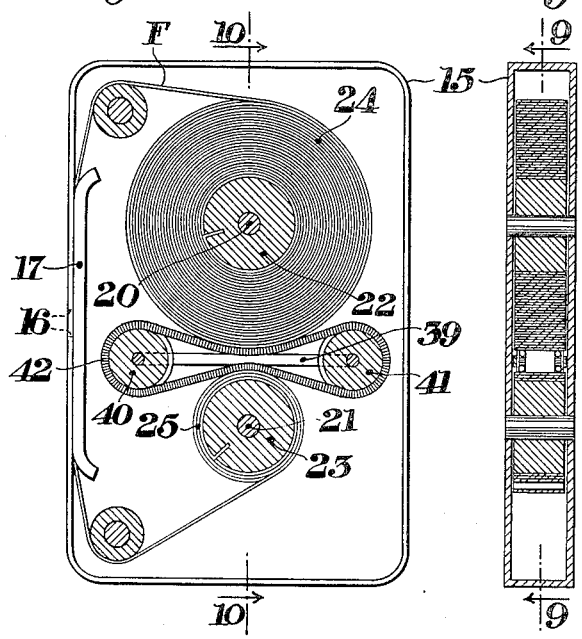
*Fig.11.*
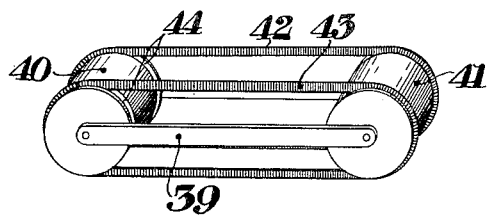
*Fig.12.*
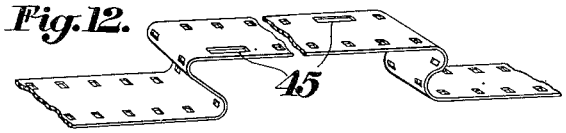
Inventor:
Otto Wittel,
Newton M Perrin
By George A. Gillette, Jr.
Attorneys Patented Jan. 9, 1934

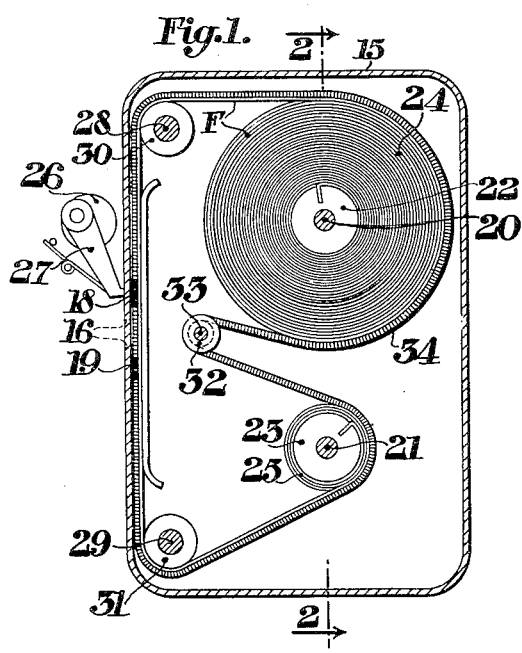

1,942,890

UNITED STATES PATENT OFFICE 1,942,890

MOTION PICTURE FILM MAGAZINE

Otto Wittel, Rochester, N. Y., assignor to Eastman Kodak Company, Rochester, N. Y., a corporation of New York Application August 10, 1931. Serial No. 556,186

10 Claims. (Cl. 88—18.4)

The present invention relates to motion picture film magazines and more particularly to film magazines in which the film is advanced solely by the film advancing mechanism of the associated motion picture apparatus.

There are many known forms of motion picture film magazines disclosing various ways of advancing the film through the magazine and associated apparatus and various ways of actuating the take-up means for the exposed film. However, all of these known magazines encounter some particular difficulty such as susceptibility to light leakage or complexity in positioning the film and film magazine within the apparatus.

The primary object of the present invention is the provision of a motion picture film magazine, through which the film is advanced, in which the film is exposed and which may be readily positioned within an associated motion picture apparatus.

Another object of the present invention is the provision of a film magazine adapted to contain film rolls rotatable about fixed axes and containing a belt means which insures simultaneous rotation of the film rolls at equal peripheral speeds.

A further object of the present invention is the provision of a motion picture film magazine containing a belt means which makes frictional contact with the outer convolutions of the film rolls and which assures equal peripheral speeds of the film rolls corresponding to the linear speed of the film through the gate of the magazine.

Still another object of the present invention is the provision of a motion picture film magazine containing a belt means and adapted to contain a pair of film rolls with arcs of contact therebetween which are sufficient to cause even and tight reeling of the film from and onto the film rolls.

A still further object of the invention is the provision of a motion picture film magazine containing a belt means which has arcs of contact of more than 90° with the outer convolutions of the film rolls in the magazine.

Another object of the invention is the provision of a motion picture film magazine containing a belt means which includes rollers to allow the movement of film and a spring belt in opposite directions over the rollers.

A further object of the invention is the provision of a motion picture film magazine containing a belt means which comprises a floating endless belt assembly adapted to make contact with the outer convolutions of film rolls within the magazine and to cause rotation of the film rolls at equal peripheral speeds.

With these objects in view, the present invention consists in certain features of novelty in the construction, combination, and arrangement of parts by which the said objects and certain other objects are effected, all as fully described with reference to the accompanying drawings, and more particularly pointed out in the appended claims. Reference is hereby made to the accompanying drawings wherein similar elements are designated by similar reference numerals and wherein:

Figure 1 is a longitudinal vertical cross-section, through the preferred embodiment of film magazine according to the invention, taken on the line 1—1 of Figure 2.

Figure 2 is a vertical transverse section, through the preferred form of film magazine, taken on the line 2—2 of Figure 1.

Figure 3 is a front elevation of the preferred form of film magazine showing the exposure aperture and slot for entry of the film advancing mechanism.

Figure 4 is a front elevation of the preferred form of film magazine especially adaptable to the use of film having two laterally adjacent exposure areas thereon.

Figure 5 is a longitudinal vertical cross-section, through a modification of the motion picture film magazine according to the invention, taken on the line 5—5 of Figure 7.

Figure 6 is a fragmentary transverse section, of the first modification of the film magazine, taken on the line 6—6 of Figure 5.

Figure 7 is a vertical transverse cross-section, through the first modified form of the motion picture film magazine of the invention, taken on the line 7—7 of Figure 5.

Figure 8 is a front elevation of the first modification of the film magazine according to the invention.

Figure 9 is a longitudinal vertical cross-section, through a second modification of the film magazine according to the invention, taken on the line 9—9 of Figure 10.

Figure 10 is a vertical transverse cross-section, of the second modified form of the film magazine, taken on the line 10—10 of Figure 9.

Figure 11 is a detailed perspective view of a floating belt assembly used in the second modified form of the film magazine according to the invention.

Figure 12 is a detailed perspective view of the film to be used in all the forms of the magazine, showing the usual perforations and the provision of slots at definite locations near the ends of the film.

One of the important features of my invention is the provision of a belt means which has especially large arcs of contact with the outer convolutions of film rolls within the magazine. The belt means preferably includes an endless belt which has sufficient resiliency to hold the outer convolution of the film tightly against the other convolutions of the film to create enough friction between all of the film convolutions so that there is only a negligible amount of slip between the convolutions of film, especially during the reeling thereof onto a take-up film roll.

Previous constructions which utilize a separate means for insuring equal peripheral speeds of the outer convolutions on film rolls are open to the objection that the film is only loosely wound onto the take-up roll. This is particularly true when rollers are used to drive the take-up roll at a predetermined peripheral speed and may be attributed to the fact that such rollers make only substantially a line contact with the outer convolution of the film, as distinguished from the large arcs of contact existing between the outer convolutions of film on the film rolls and the endless belts of the belt means, according to the invention. These large arcs of contact between the film and endless belts of the belt means are also especially advantageous in reducing the slip between the belt means itself and the film as well as reducing the slip between the convolutions of film.

In the illustrated embodiments of my invention, the film rolls, magazine proper, gate therein and light-sealing construction for the gate are all similar and form no part of the present invention. The magazine 15 is of the usual flat rectangular formation, having rounded corners if desired or necessary for compactness. The front side of the magazine 15 is provided with an exposure aperture 16 behind which the gate member 17 is positioned. Light seals 18 and 19 are positioned between the gate member 17 and front wall of magazine 15 on each side of exposure aperture 16 and may each be composed of two facing strips of suitable light sealing material, such as black plush or velvet. The exposure aperture 16, gate member 17, and light seals 18 and 19 will hereinafter be referred to by the generic term "gate".

Spindles 20 and 21 extend between the sides of magazine 15 and are centrally located therein. The film rolls are mounted to rotate about the fixed axes of spindles 20 and 21 and may be provided in any known form. For the purpose of illustration, I have shown the film rolls to be composed of cores 22 and 23 provided with slots for the ends of the film F. The supply film roll 24 encircles core 22 which may rotate about spindle 20. The take-up film roll 25 encircles core 23, which may rotate about spindle 21. The path of the film through the magazine is the same in all modifications, extending from supply film roll 24 over a roller more fully described hereinafter, through the gate, and over another roller to be later described onto the take-up film roll 25.

It should be noted that according to my invention, the film is exposed while within the gate of the magazine. It should also be noted that the usual intermittent motion is transmitted to the film while in the magazine by means of a film advancing mechanism of known construction, having claws or teeth which enter through slots in front of the magazine to engage the perforations of the film. Any type of film advancing mechanism is suitable for the purposes of the present invention although I have illustrated a ratchet type of film advancing mechanism comprising a disk 26 and a claw 27 having one end eccentrically mounted on disk 26 and the other end bevelled so that the film perforations are engaged during movement of the claw 27 in one direction only. The advantages of the ratchet type of film advancing mechanism are its simplicity and ratchet action to prevent backward movement of the film through the gate.

In the preferred embodiment of my invention, spindles 28 and 29 extend between the sides of the magazine 15 and are located near the front of the magazine. Rollers 30 and 31 are mounted upon spindles 28 and 29, respectively, roller 30 functioning to conduct the film F from supply film roll 24 to the gate, while roller 31 functions to conduct the film F from the gate to take-up film roll 25.

A grooved roller 32 is rotatably mounted on a spindle 33 between the sides of magazine 15 and is located behind the gate between the film rolls 24 and 25. An endless belt 34 makes frictional contact with the major portion of uncovered film, said endless belt 34 having a large arc of contact with the outer convolution of film roll 24 and extending with the film over roller 30, through the gate, under roller 31 to the take-up film roll 25. The remainder of the belt extends around the grooved roller 32 and again to the outer convolution of supply film roll 24. The location of roller 32, that is offset with respect to the line of centers of the film rolls, causes the desired large arcs of contact between the endless belt 34 and the outer convolutions of film rolls 24 and 25.

If the film magazine is to be used with single frames across the entire width of the film, the endless belt 34 must extend around the film and through the gate in contact with the surface of the film near the edge thereof, as shown in Fig. 2. In such case, it will only be necessary to move the film through the magazine in one direction and only a single slot 35 need be provided in the front of magazine 15, as shown in Figure 3. In this case also, the roller 32 will be grooved near the end thereof to maintain the endless belt 34 in its proper position along the side of the film F.

On the other hand, if the film is to have two laterally adjacent exposure areas, the endless belt 34 will extend around the film at the center thereof as indicated in Figure 4. Also the front of magazine 15 should be provided with two slots 35 symmetrically located with respect to exposure aperture 16, as shown in Figure 4. If the endless belt 34 is to extend centrally around the film F, the roller 32 should be centrally grooved in order to maintain the belt 34 in proper position. Thus, it will be apparent that the location of the groove in roller 32 will control the lateral position of the endless belt 34 on the film F.

In the first modification of the film magazine, according to the invention, and shown in Figures 5–8, inclusive, the endless belt 34 has a longer and different path than that shown in the preferred embodiment. In this modification, four rollers are rotatably mounted within the magazine 15 near the corners thereof. These rollers comprise grooved hubs 36 and disks 37 rotatably mounted on spindles 38. The four rollers of this first modification may be considered as two pairs of rollers, one pair located above and on each side of the axis for the supply film roll 24, and the other pair located below and on each side of the axis for the take-up film roll 25. The film F, in its passage through the gate to the take-up film roll 25, passes over one roller of each pair in contact with the peripheries of end disks 37, as more particularly illustrated in Figure 6. The endless belt 34 passes over the grooved hubs 36 of the rollers, the end discs 37 of which are conducting the film F in a direction opposite to the movement of the belt.

Therefore, grooved hubs 36 and end disks 37 are rotatable in opposite directions upon spindles 38. The endless belt 34 passes behind the gate between the grooved hubs 36 of the two rollers which are in contact with the film F, around the outer convolutions of the film rolls 24 and 25, and over the grooved hubs 36 of the remaining two rollers. Although this first modification contains one more roller than the preferred embodiment, and although the rollers are of more complex construction, the endless belt 34 does not pass through the gate, and can remain in the same position whether the film is to be used with a single exposure area across the width of the film or with laterally adjacent exposure areas across the width of the film. The magazine may be adapted to either type of use by the provision of symmetrically located slots 35 in the front of magazine 15.

In the two forms of my invention described above, the endless belt 34 has especially large arcs of contact with the outer convolutions of film rolls 24 and 25. The magazines in each case have been illustrated as having a substantially complete supply of unexposed film. Thus, with a majority of film on the supply film roll 24, the endless belt 34, in each case, has an arc of contact with the outer convolution of film which is substantially 180°, while the arc of contact of endless belt 34 with the outer convolution of take-up film roll 25 is only slightly more than 90°. Upon reeling of the film F from the supply film roll 24 to take-up film roll 25, the diameters of these rolls will change and the arcs of contact between the outer convolutions of film and the endless belt 34 will also vary.

Thus it will be seen that the two arcs of contact will vary between 90 and 180° as the film is reeled from the supply to the take-up film roll, this variation being in direct proportion to the variation in the diameters of the film rolls 24 and 25.

The second modification of my invention consists in the insertion of a floating endless belt assembly between the outer convolutions of the film rolls 24 and 25. The support and location of the film rolls within magazine 15 and the construction of magazine 15 is the same as in the preferred form of the invention. The floating endless belt assembly comprises a pair of bars 39 which have rollers 40 and 41 rotatably mounted between the ends thereof. The endless belt means extends around rollers 40 and 41 and is preferably composed of a pair of spring belts 42 and 43 engaging grooves 44 near each end in the peripheries of rollers 40 and 41. The floating belt assembly is inserted between the lower part of supply roll 24 and the upper part of take-up roll 25 so that belts 42 and 43 move over the perforated portions of the film on said rolls 24 and 25. Consequently, if spring belts are used, the engagement between belts 42 and 43 and the film F does not depend entirely upon friction, but will be supplemented by actual engagement of the convolutions in spring belts 42 and 43 with the edges of the perforations in the film. As the film is wound through the magazine according to this modification, the diameter of supply film roll 24 will decrease with a corresponding increase in the diameter of take-up film roll 25. With such variation in the diameters of rolls 24 and 25 the floating belt assembly will move upwardly within the magazine 15. As illustrated, Figure 9 shows the position of the floating belt assembly when the supply film roll 24 is unexposed.

The endless belt 34 in the preferred and first modified forms of the invention and the belts 42 and 43 in the second modified form of the invention may be composed of any suitable material which will give the desired friction between the surface of the film F and the surface of the belts 34, 42 or 43. The path of the belts will vary slightly in length as the film is wound from the supply film roll 24 to the take up film roll 25. Therefore, it is preferable to manufacture the belts out of a resilient material so that the pressure of the belt on the surface of the film will remain substantially constant. Resiliency in the belt is also necessary to hold the outer convolutions of the film rolls in contact with each other to promote the tight and even reeling, previously mentioned. In selecting a material for the belts, it should be remembered that sulphur and the silver in the film emulsion have an affinity for one another with the formation of silver sulphide. Therefore, if the endless belts are to be made of a material containing sulphur, such as rubber, great care should be taken to prevent the impending reaction between the sulphur and silver in the emulsion. I have found that spring belts which are well known in the motion picture art function very satisfactorily in all of the modifications, according to my invention, although obviously I do not intend to be limited to the use of such spring belts only, as there may be other equivalent endless belts which are equally satisfactory.

When the magazine is to be used for film intended to have laterally adjacent exposure areas, it is evident that there must be some provision for preventing the reeling of all the film from the supply film roll 24 onto the take-up film roll 25. Therefore, I provide slots 45 in the perforated edges of the film at predetermined distances from the ends thereof. The position and formation of these slots is illustrated in Figure 12 of the drawings. With slots 45 in the perforated edges of the film F, the film advancing mechanism will no longer be able to operate to move the film from the gate when such slot registers with the slots 35 in the front of magazine 15. Upon reversal or inversion of the film magazine to expose the other half of the film, the film advancing mechanism will then engage the perforations beneath the other slot 35 in the front of magazine 15. The provision of such slots in the film to prevent the complete movement of the film from the supply roll to the take-up roll is only disclosed here for the purposes of completely describing a film magazine embodying my invention and which is entirely satisfactory in operation.

Since many modifications of any or all of the forms of my invention may readily be developed by those skilled in the art, the present disclosure is to be construed in an illustrative and not in a limiting sense. The appended claims define the scope of my invention and are intended to include all of the equivalents for any of the elements disclosed herein.

Having now particularly described my invention, what I claim and desire to secure by Letters Patent of the United States is:

1. The combination with a film magazine adapted to contain a pair of film rolls rotatable about fixed axes, of a plurality of rollers within said magazine and provided with circumferential grooves, and a belt means extending around the rollers within said grooves and adapted to make frictional contact with the outer convolutions of said film rolls and simultaneously to rotate said film rolls at the same peripheral speed.

2. In a motion picture apparatus, the combination with a film magazine having a gate and adapted to contain a pair of film rolls rotatable about fixed axes, said film being adapted to extend between said rolls and through said gate, and a belt means adapted to make frictional contact with the outer convolutions of said film rolls, of a film advancing mechanism adapted to engage and move the film through said gate and between said film rolls within the magazine.

3. In a motion picture apparatus, the combination with a film magazine having a gate and adapted to contain a pair of film rolls rotatable about fixed axes, said film being adapted to extend between said rolls and through the gate, and a belt means adapted to make frictional contact with the outer convolutions of said film rolls, of an intermittent film advancing mechanism adapted intermittently to move the film through said gate and intermittently to advance said belt means whereby the film is advanced and the film rolls are rotated at corresponding linear and peripheral speeds, respectively.

4. The combination with a film magazine having a gate and adapted to contain a pair of film rolls rotatable about fixed axes, said film being adapted to extend from one film roll to the other through the gate, of an endless belt extending around the film rolls and through the gate, and a grooved roller rotated between the film rolls and adjacent the gate whereby said endless belt always has arcs of contact with the film rolls greater than 90 degrees.

5. The combination with a film magazine having a gate and adapted to contain a pair of film rolls rotatable about fixed axes, said film being adapted to extend from one film roll to the other through the gate, of an endless belt in contact with the outer convolutions of the film rolls and with the outer surface of the film through the gate, a pair of rollers for conducting the film and endless belt between the film rolls and the gate, and a roller offset with respect to the line of centers of the film rolls and provided with a circumferential groove located to control the lateral position of the endless belt on the film.

6. The combination with a film magazine adapted to contain a pair of film rolls rotatable about fixed axes, said film being adapted to extend from one roll to the other, of two pairs of rollers rotatable about fixed axes within the magazine, the rollers of each pair being adapted to be located above and below the respective film rolls on each side of the axis for the adjacent film roll and an endless belt extending around the rollers and adapted to contact with the outer convolutions of the film rolls.

7. The combination with a film magazine having a gate and adapted to contain a supply film roll and a take-up film roll, both rotatable about fixed axes, and two pairs of rollers rotatable about fixed axes within said magazine, each pair of rollers being adapted to be located above and below the supply and take-up film rolls, respectively, said film being adapted to extend from the supply roll over one roller of a pair, through the gate and over one roller of the other pair to the take-up roll, and an endless belt extending around all of the rollers, behind the gate and adapted to contact the outer convolutions of the film rolls.

8. The combination with a film magazine having a gate and adapted to contain a supply film roll and a take-up film roll, both rotatable about fixed axes, of two pairs of rollers rotatable about fixed axes within said magazine, each pair of rollers being adapted to be located above and below the supply and take-up film rolls respectively, each roller including a grooved hub and end disks of greater diameter than said hub and rotatable in opposite directions, said film being adapted to extend from the supply film roll, over one roller of each pair in contact with the periphery of the end disk to the take-up film roll, and an endless belt extending around all of the rollers in the grooved hubs thereof, behind the gate and adapted to make contact with the outer convolutions of the film rolls, the endless belt and film moving in opposite directions without contact over one roller of each pair.

9. The combination with a film magazine adapted to contain a pair of film rolls both rotatable about fixed axes, of a floating belt assembly including a pair of bars, a pair of rollers between the ends thereof, and a pair of spring belts extending around said rollers and adapted to make frictional contact with the outer convolutions of the film rolls to insure equal peripheral speed thereof.

10. The combination with a film magazine adapted to contain a pair of rolls of film having perforated sides, both rotatable about fixed axes, of a floating belt assembly including a pair of bars, a pair of rollers provided with grooves near the ends thereof and rotatably mounted between the ends of said bars, and a pair of spring belts extending around said rollers in said grooves and adapted to make frictional contact with the perforated sides of the film on the film rolls.

OTTO WITTEL.